(12) United States Patent
Caron et al.

(10) Patent No.: US 9,430,192 B2
(45) Date of Patent: Aug. 30, 2016

(54) METHOD AND SYSTEM FOR GENERATING RANDOM NUMBERS

(71) Applicant: UNIVERSITY OF WINDSOR, Windsor (CA)

(72) Inventors: Richard Caron, Windsor (CA); Michael Lee, Windsor (CA)

(73) Assignee: UNIVERSITY OF WINDSOR, Windsor (CA)

(*) Notice: Subject to any disclaimer, the term of this patent is extended or adjusted under 35 U.S.C. 154(b) by 338 days.

(21) Appl. No.: 14/290,172

(22) Filed: May 29, 2014

(65) Prior Publication Data

US 2016/0117149 A1  Apr. 28, 2016

Related U.S. Application Data

(60) Provisional application No. 61/830,361, filed on Jun. 3, 2013.

(51) Int. Cl.
G06F 7/58 (2006.01)

(52) U.S. Cl.
CPC ........... G06F 7/588 (2013.01); *G06F 2207/58* (2013.01)

(58) Field of Classification Search
CPC ....................................................... G06F 7/588
USPC .................................................. 708/250–256
See application file for complete search history.

(56) References Cited

U.S. PATENT DOCUMENTS 8,930,429 B2 * 1/2015 Cerf .................. G06F 7/588
708/255

OTHER PUBLICATIONS

Jimmin Chang et al. Flicker Noise in CMOS Transistors from Subthreshold to Strong Inversion at Various Temperatures; IEEE Transactions on Electron Devices; vol. 4, No. 11, Nov. 1994; 1965-1971.

CCIR International Radio Consultative Committee; Characteristics and Applications of Atmospheric Radio Noise Date; International Telecommunication Union; Geneva; 1983; 1-72.

Siew-Hwee Kwok et al.; A comparison of Post-Processing Techniques for Biased Random Number Generators; WISTP, pp. 175-190.

Sumit Majumder; Random Telegraph Signal Noise in CMOS Image Sensor (CIS) and Use of a CIS in a Low-Cost Digital Microscope; McMaster University; Canada; Aug. 2011; pp. 1-107.

National Institute of Standards and Technology (NIST); Security Requirements for Cryptographic Modules.; United States of America Department of Commerce; May 25, 2001; 1-61.

J. Sayers, et al.; Studies of Atmospheric Noise on Mauna Kea at 143 GHz with Bolocam, Proc. SPIE vol. 7020, Millimeter and Submillimeter Detectors and Instrumentation for Astronomy IV, 70201Q; Aug. 28, 2008.

(Continued)

*Primary Examiner* — Tan V. Mai

(57) ABSTRACT

A method and apparatus for generating true random numbers is provided which is hardware based, and which uses unpredictable physical noise produced by an optoisolator. Specifically, the noises resulting from one or more of quantum shot, thermal noise, flicker, and the photoelectric effect are used as variable energy sources for subsequent conversion into a bitstream used for random number selection. The apparatus is preferably provided with a through hole prototype design and construction which requires minimal number of components reducing overall costs.

20 Claims, 4 Drawing Sheets

(56) References Cited

OTHER PUBLICATIONS

Constantin Grozea, Ionut Gabriel Tarsa, Gigi-Daniel Budariu; Study on a True Random Number Generator Design for FPGA. IEEE, 2010; pp. 461-464.

Donald Alexander Feldman; An Atmospheric Noise Model with Application to Low Frequency Navigation Systems; National Technical Information Service, U.S. Department of Commerce; Jun. 1972; pp. 1-205.

C.O. Lee Boyce Jr., J. David Powell; A Time Domain Atmospheric Noise Level Analysis; 2003; p. 1-6.

Amit Kumar Panda, Praveena Rajput, Bhawna Shukla; Design of Multi Bit LFSR PNRG and Performance Comparison on FPGA using VHDL; International Journal of Advances in Engineering & Technology; Mar. 2012; vol. 1, Issue 1; pp. 566-571.

Alireza Marandi, Nicke C. Leindecker, Konstantin L. Vodopyanowv, and Robert L. Byer; All-optical Quantum Random Bit Generation from Intrinsically Binary Phase of Parametric Oscillators; Optics Express, vol. 20, No. 17; Aug. 8, 2012; pp. 19322-19330.

\* cited by examiner

METHOD AND SYSTEM FOR GENERATING RANDOM NUMBERS

RELATED APPLICATIONS

This application claims priority and the benefit of 35 USC §119(e) to U.S. Provisional Application Ser. No. 61/830,361, filed 3 Jun. 2013, the disclosure of which is incorporated herein by reference in its entirety.

SCOPE OF THE INVENTION

The present invention relates to a system and method for generating random numbers, and more particularly the use of an apparatus which utilizes generated background noise which is converted into a random bit stream as random number source.

BACKGROUND OF THE INVENTION

Random numbers have a wide variety of uses from Monte Carlo simulations to computer games, and include without restriction: lottery number generation; generating parameters of systems that require random variability such as simulations; testing of error correcting codes and communication by the use of random errors; use in extra-sensory perception (ESP) experiments; art, such as random pictures or music generation; gambling and gaming, such as the generation of random events, realism, and AI engines; vector initialization; padding; and in authentication and cryptographic key generation.

Conventionally two major methods are used to generate random numbers, one being algorithmic and the other being nondeterministic. Random number generation by algorithmic, also known as a Pseudorandom number generator (PRNG), uses a deterministic formula to calculate a periodic sequence of numbers. Usually, the numbers generated are completely determined by an initial state or seed. A number of different pseudorandom number generators (PRNG) exist, including those falling into the flowing categories:

Linear Congruential is a recurrence relation of the form $X_i = aX_{i-1} + b \mod m$, where a b m $\in Z$.

Lagged Fibonnacci is a recurrence relation of the form $X_i = (X_{i-r} \otimes X_{i-s}) \mod m$ where r, s, m $\in Z$ are constants with r>s and $\otimes$ is a binary operator such as +, -, x, xor. The relation also requires an initial data set $(X_1, X_2, X_3, \ldots, X_r)$.

Linear Feedback Shift Registers (LFSR) are based on linear polynomials of the form $p(x) = x^n + p_{n-1}x^{n-1} + \ldots + p_2 x^2 + p_1^x + p_0$, where $p_i \in \{0, 1\}$. It is desired to choose a primitive polynomial since this would yield a LFSR of maximal periodicity.

As a primitive polynomial is irreducible and cannot be factored into the product of polynomials of smaller degree, $p_0$ is chose as $p_0 = 1$ since if $p_0 = 0$ then the polynomial would be divisible by x.

The state $(X_0, X_1, X_2, \ldots, X_{n-1})$ is selected to be an initial state, where $X_i \in \{0, 1\}$, and the feedback function is defined:

$f(x_0, x_1, x_2 \ldots, x_{n-1}) = c_{n-1}x_{n-1} + \ldots + c_2 x_2 + c_1 x_1 + c_0 x_0 \mod 2$, where $c_i = p_i$ for $i = 0, \ldots, n-1$. ($p_i$'s come from the coefficients of p(x).)

Let $X_{out} = f(X_0, X_1, X_2, \ldots, X_{n-1})$

The recurrence relation used is $X_i = X_{i+1}$, for $i = 0, \ldots, n-2$ $X_{n-1} = X_{out}$ Cryptographic PRNG is a generator that use cryptographic constructs or some hard problem to create sequences which are safe for use in cryptography. One example of such as generator is the Blum Blum Shub (B.B.S.) PRNG. Blum Blum Shub (B.B.S.) is a cryptographically safe pseudorandom number generating algorithm defined by the following recurrence relation:

$x_n + 1 = x^2 \mod m$, where m=pq, p and q are large primes and are congruent to 3 mod 4 (this ensures that the square root exists).

For a large cycle length, $\gcd(\phi(p-1), \phi(q-1))$ is made small. Generally, the least significant bit(s) or parity of $x_{n+1}$ is the random output. The security of the generator is reduced to the integer factorization problem since the only known way to solve the quadratic residue problem is to factor m.

Unlike true random number generators, pseudorandom number generators contain the intrinsic flaw of being periodic. However, the periodicity of an algorithmically generated sequence, such as those generated by PRNGs, may be astronomically large, thus giving the sequence a feeling of being unpredictable with a desired uniformity of distribution. The periodicity of a well designed pseudorandom number generator may be so large that it is not likely for a computer to complete a single cycle. A generator with this property may be well suited for cryptographic purposes as long as its internal state remains secret.

Conventional nondeterministic random number generators, also referred to as a True random number generator (TRNG), use physical phenomena that are believed to be nondeterministic, such as thermal noise (Johnson-Nyquist noise), nuclear decay, or Quantum Shot Noise to generate random data.

The general layout of a conventional TRNG 8 is shown in FIG. 1. Typically, conventional TRNG 8 includes a noise source 10, such as nuclear decay or thermal noise, a noise collector 12 configured to receive or sense "noise", and a microprocessor 14. The noise generated in the noise source 10 is sent or received by the noise collector 12, where it is transformed into something usable, allowing the creation of random data. The random data is then post processed by a suitable algorithm in the microprocessor 14, in an attempt to condition and remove any bias, so that it allows the TRNG 8 to conform to the desirable property. After post processing, the random data is provided as a desired electronic/video output.

TRNGs are in general slower than PRNGs. This can be rather cumbersome if one requires the generation of large numbers of random numbers. Pseudorandom number generators are generally very fast and have throughputs that are directly related to the speed of the device on which they are implemented. It has been recognized that a combination of deterministic and nondeterministic systems may advantageously be used to create a hybrid random number generator (HRNG). In such a system a TRNG is used to seed the internal state of a PRNG. The advantage of such systems, and provided it can collect enough entropy from its source, is that the overall system generation rate may be fast, and have the desirable property of a random number generator, allowing for good quality numbers to be generated at acceptable rates.

Recently, a TRNG has been proposed which utilizes fluctuating beam intensity of a semiconducting laser as a chaotic source of randomness to produce a high speed stream of bits with sequence rates of up to 12.5 Gbits/s. The generation of true random numbers has however, to date proven to be a difficult process. Since digital hardware is designed to perform predictably in a deterministic way, this typically makes finding unpredictable events outside of the scope of standalone digital systems. As a result, software designers are forced to utilize external events such as keyboard and mouse clicks, hard disk timings, or Ethernet packet intervals, as well as other technologies from analog technology to extract unpredictable events. However, such conventional analog techniques have drawbacks, since information is lost when any analog signal is transformed discretely. This means that even if the analog signal shows perfect randomness, the process of extracting the randomness may be flawed. Such flaws may contribute to a bias in the random data, or worse, cause predictability in the sequence.

More recently, the use of reconfigurable digital hardware such as Complex Programmable Logic Devices (CPLDs), Application Specific Integrated Circuits (ASICS), and Field Programmable Gate Arrays (FPGAs) have been applied as new techniques for the generation of random numbers. These new techniques use jitter and metastability to provide digital systems with the facilities to easily access unpredictable events. In particular, Jitter is the short-term variation of a digital signal's significant instants, that is, the deviation of the timing edges from their ideal positions in time. Metastability is the unpredictable oscillation, which is neither logically high or low, of a signal that eventually stabilizes to an unpredictable output (high or low).

SUMMARY OF THE INVENTION

To at least partially overcome some to the difficulties associated with conventional random number generators, the present invention provides for an apparatus and its method of use for generating true random numbers, and which uses unpredictable physical noise produced by an optoisolator (or optoisolator like device) for conversion into a random bitstream which is used as a random number source. More preferably, the apparatus uses noise generated from one or more of quantum shot, thermal, flicker and photoelectric effect produced by an optoisolator adapted to receive electromagnetic radiation from a light source, and preferably an LED light source, as a variable energy source for conversion into digital-data.

In one possible embodiment, the invention provides a random number generator (RNG) operable to produce independent and/or identically (uniformly) distributed numbers, such that the sequences produced are both unpredictable and non-reproducible. More preferably, a random number generator is provided which if started in an identically known state, achieves an output which is different for each run.

In another possible embodiment, a random number generator is provided which is operable to output one or more sequences $S=(x_1, x2, x3, \ldots, xn)$, and which are random if $\forall$ x $\in$ S, x is statistically independent uniformly, and distributed unpredictable.

The applicant has realized an improved TRNG based on optoisolator provided electronic noise as an unpredictable process which exists temporarily or usually physical in nature. It has been recognized that noise is normally unwanted and a nuisance but, the context of such number generators, unavoidable. In particular, contrary to conventional apparatus which use specially designed techniques such as filtering, the present invention stabilizes and minimize the effects of noise, for the purpose of random number generation. In accordance with one aspect of the invention, the inventors seek to amplify, harvest, and utilize the same "undesirable" noise properties that conventionally one strives to eliminate, for its chaotic unpredictable behaviour.

The applicant has appreciated that in the present suitable sources of noise can be found in different types of conductors and semiconductors such as resistors, diodes, and transistors. Other sources further include atmospheric noise, nuclear decay, unstable lasers, free running ring oscillators, and metastable flipflops. It has been found, however, that the physical noise preferably used by the present invention would therefore include combinations of thermal noise; quantum shot noise; flicker, and/or photoelectric noise alone or in combination.

Thermal noise (also known as Johnson and Nyquist noise) is caused by thermal electron agitation which occurs in all semiconductors and conductors. It is an intrinsic disruption, as the result of heat, which causes random component fluctuations of an electron's path. It has been recognized that thermal noise has a constant power spectral density up to a high frequencies, noise with this property is called "white noise". Some conductors and semiconductors which display thermal noise include resistors, transistors, and diodes. Jitter which occurs in free running oscillators is another example of random fluctuations caused by thermal noise.

Quantum shot noise is the noise produced by an electron when it randomly passes through a potential barrier caused by the build up of potential energy which is transformed into kinetic energy. This behaviour is random due to the non-uniformity of the silicon substrate which the electron passes through. Transistors exhibit this property when electrons cross the neutral barrier between their P and N layers.

Photoelectric noise is a type of quantum noise produced by current stimulated by optical absorption of photons into a silicon substrate. An example of semiconductor that exhibits this property is a phototransistor.

Flicker (also known as 1/f and pink noise) is the low frequency noise caused by carrier-density fluctuations, normally due to imperfections in n-channel devices, or mobility of carrier fluctuations in p-channel devices. The frequency spectrum of the noise steadily falls off into higher frequencies, with a noise density that is inversely proportional to its frequency (1/f).

While the present invention provides an apparatus which utilizes in a preferred construction, one or more of thermal noise, flicker, quantum shot noise and/or photoelectric noise, other noise sources such as avalanche noise, flicker, radioactive decay and/or atmospheric noise could be combined in less optimum applications, with or without further filtration may also be used.

Avalanche Noise is the noise produced when electrons gain a large kinetic energy and thus a high voltage gradient caused by a strong electric field, such that colliding electron hole pairs with the atoms in the crystal lattice dislodge additional electron hole pairs through physical impact causing spill over or an avalanche effect, if this occurs quick enough the crystal structure will begin to conduct. This type of phenomenon occurs when a P-N junction is operated in reverse bias and the potential at which this occurs at is called breakdown voltage. An example of a semiconductor that is capable of exhibiting this property is a Zener diode.

Burst Noise (or Popcorn noise) is the noise produced by sudden random current-gain transitions, from two or more levels, that normally occur with low frequencies of less than 100 Hz and can last for several milliseconds. This can be caused by defects in a semiconductor's crystal lattice which is believed to randomly trap and release charge. Traditionally this type of noise is found in audio circuits where it can be recognized as the familiar sound of popping popcorn when outputted on a speaker.

Radioactive Decay is the process by which an unstable atom decays by emitting energy and ionizing particles. When this occurs the nucleus of the atom transforms into another nucleus or a lower energy state. This process continues until the nucleus attains a stable state. Decay emissions are random and unpredictable. Normally one is able to use a Geiger tube to detect these emissions. The three principal different types of radioactive decay include Alpha, Beta, and Gamma decay.

Atmospheric noise is the noise caused by fluctuations in atmospheric energy or heat radiation occurring in the radio spectrum over a broad band and has an upper temperature limit usually below 300 Kelvin. There are many causes for atmospheric noise such as electrical discharge between cloud to cloud or ground interactions, radiation from the sun striking the atmosphere, or galactic radiation from space. The frequency of the noise is predominantly below 30 MHz.

In accordance with a preferred embodiment, the collected noise may advantageously be converted into a digital random bit stream for either direct output, or more preferably for post processing to generate an output representative of a random generated number.

Conventional physical methods for extracting randomness have been recognized as having a bias and deviate from their ideal statistical structure of being independent and uniformly distributed. This is partially because the process of harvesting random events is flawed, since most physically sampled random events are analog in nature, or have an analog component to them, information tends to be always lost when an analog signal is transformed discretely. In addition, other intrinsic issues may also exist which may play a role in a biased random number extraction, such as faulty tolerances of components in the system. It is recognized that use of an algorithmic process or post processing may advantageously be used to reduce or eliminate statically weakness by attempting to remove unwanted bias from the random bitstream. Preferably the algorithmic process processes n-bits of input and outputs m-bits in such a way that helps ensure the desired statistical output of the generator. One non-limiting example of such a function would include a Von Neumann Corrector. In particular, the applicant has appreciated that a Von Neumann corrector algorithm may produce a more unbiased output in accordance with the theorem wherein the algorithm is used for post processing the generated random bitstream by utilizing data bits of non-overlapping pairs of successive bits. The rules for processing such a generated random bitstream are as follows:

1. Take two bits from the random stream as input.
2. If they are the same, then discard.
3. If they are different then take the first bit to be the random bit for output.

c is the constant bias of the input data.
x is the random input bit.
P(x) is the probability of input x.
So, $$P(x=1)=(1/2\_+c) \text{ and } P(x=0)=(1/2\_-c)$$

Since the input bits to the function are considered to be independent, the probabilities of successive bits can be multiplied to obtain P("10"), whereby.

$$P(\text{``}10\text{''})=P(x=1)P(x=0)=(1/2+c)(1/2-c)$$

$$P(\text{``}01\text{''})=P(x=0)P(x=1)(1/2-c)(1/2+c)$$

From the foregoing it is possible to calculate that the probability of whether the Von Neumann Corrector is perfectly unbiased. Further, for the case of producing a '0' as output, it is noted that '1' is similar. So, $$P(\text{Output is } 0) = P(\text{``}01\text{''} \mid \text{Output is produced}).$$

$$= \frac{P(\text{``}01\text{''})}{P(\text{``}01\text{''}) + P(\text{``}10\text{''})}$$

$$= \frac{\left(\frac{1}{2}-c\right)\left(\frac{1}{2}+c\right)}{\left(\frac{1}{2}-c\right)\left(\frac{1}{2}+c\right)+\left(\frac{1}{2}+c\right)\left(\frac{1}{2}-c\right)}$$

$$= \frac{1}{1+1}$$

$$= \frac{1}{2}.$$

And so, it follows that the Von Neumann Corrector may advantageously provide is perfectly unbiased.

Other algorithmic processes that may be useful for post processing would also include Linear feedback shift registers (LFSR) and Cryptographic functions such as block ciphers.

Linear feedback shift registers (LFSR) have been used to whiten or post process sequences to produce output that both appear to be random, and which has a very long cycle before repetition when a well-chosen feedback function is used. Cryptographic Block cipher is a symmetric keyed algorithm that operates on fixed length blocks of data, such as the Advanced Encryption Standard (AES). Modern block ciphers are well suited as post processors for RNGs since they inherently, by design, produce nonlinear output with little or no correlation to the input and the output is uniform in such a way that one can not discern it from randomness.

Accordingly, in one aspect the present invention resides in an apparatus for generating random numbers comprising, an optoisolator including, a light source operable to output electromagnetic energy, a sensor for sensing electromagnetic energy output by the light source, an optical transmission path for propagating the output electromagnetic energy generated by the light source to the sensor, the sensor being electrically isolated from the light source and operable to convert said sensed electromagnetic energy to electric signals, and wherein the sensing of said electromagnetic energy by said sensor produces electronic noise signals selected from at least one of the group consisting of flicker, thermal noise, quantum shot noise and photoelectric noise, a digital converter for digitally converting the produced noise signals into a bitstream, and a processor electronically communicating with the digital converter, the processor having programme instructions operable to process input bits from the bitstream and generate output bits based thereon a representative of a random number.

In another aspect, the present invention resides in a random number generation apparatus comprising: an optoisolator including, an electromagnetic energy source operable to output electromagnetic energy, a sensor for sensing output electromagnetic energy, and an optical transmission path optically coupling said electromagnetic energy source and said sensor, the sensor comprising at least one of a phototransducer and a photodiode which on receiving at least part of the output electromagnetic energy is operable to produce electric noise signals from each of the group consisting of thermal noise, flicker noise, quantum shot noise and photoelectric noise, a digitizer for receiving and digitally converting said noise signals into a bitstream, and a processor electronically communicating with the digitized for receiving said bitstream, the processor including program instructions for processing pairs of bits from the bitstream using a Von Neumann correction, and for generating output bits in the event of a transition in the input bitstream.

In yet a further aspect, the present invention resides in a random number generation apparatus comprising: an optic coupler comprising a light source operable to output electromagnetic energy, a light sensor and an optical transmission path for propagating the output electromagnetic energy to the light sensor for sensing, the light sensor being operable to convert sensed electromagnetic energy to electric signals, and wherein the propagation of said output electromagnetic energy along said optical transmission path and/or the sensing of electromagnetic energy by the light sensor produces noise signals selected from two or more of the group consisting of thermal noise, quantum shot noise, flicker and photoelectric noise, an amplifier for receiving and amplifying said noise signals, a digitizer for receiving and digitally converting said amplified noise signals into a bitstream, and a processor electronically communicating with said digitizer and having stored thereon program instructions for processing input bits from the bitstream, and generated an output variable bit rate based thereon representative of a random number.

BRIEF DESCRIPTION OF THE DRAWINGS

Reference may be had to the following detailed description, taken together with the accompanying drawings in which.

DETAILED DESCRIPTION OF THE PREFERRED EMBODIMENTS

Figure 4:
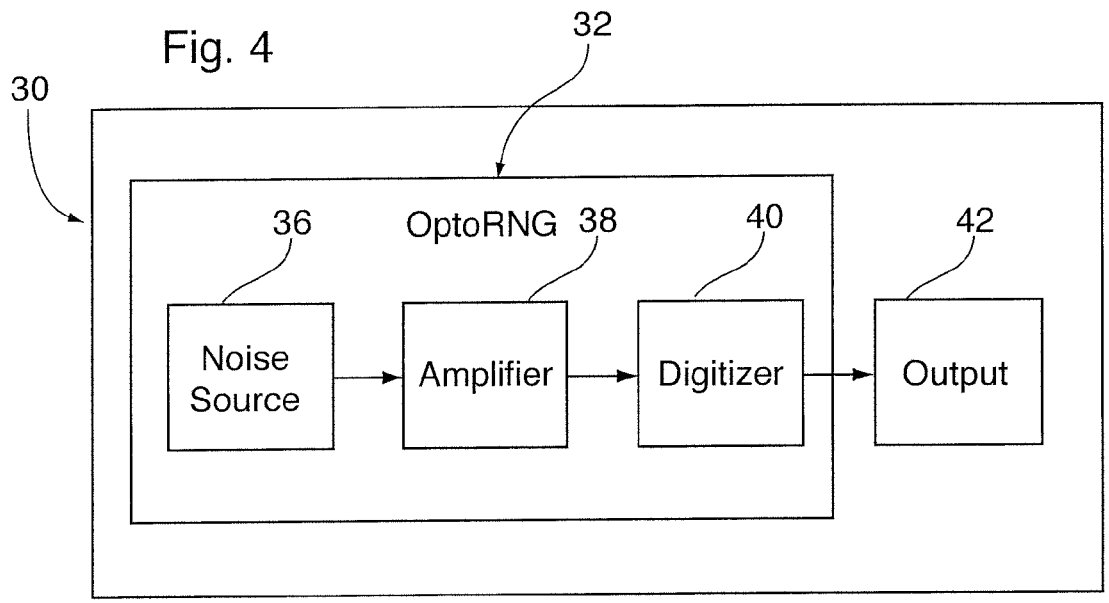
FIG. 4 shows schematically an apparatus for generating random numbers using the optoisolator of FIG. 3 in accordance with a first embodiment.

FIG. 4 shows best schematically the construction of a random number generating system 30 in accordance with a preferred embodiment of the invention. The system 30 functions as a random number generator which, as will be described, is operable to generate using noise randomly produced in the sensing of electromagnetic radiation, and provide to a user an electronic, audio and/or video based random number output 42.

As will be described, in a most preferred embodiment, the system 30 is operable to produce random numbers using an optoisolator 36 as a noise source in the random number generation. Most preferably, the noise generated by the optoisolator 36 is a combination of each of quantum shot noise, flicker, thermal noise, together with noise caused by the Photoelectric effect in the emission and sensing of electromagnetic energy. The optoisolator 36 is electronically connected to an amplifier 38 and a digitizer 40. The generated noise is amplified by the amplifier 38 and then digitized into a random bit stream by the digitizer 40 to a level which allows data output to be output directly, or thereafter subject to post processing by a microprocessor or embedded system to better extract the randomness as logic highs and lows.

Figure 1:
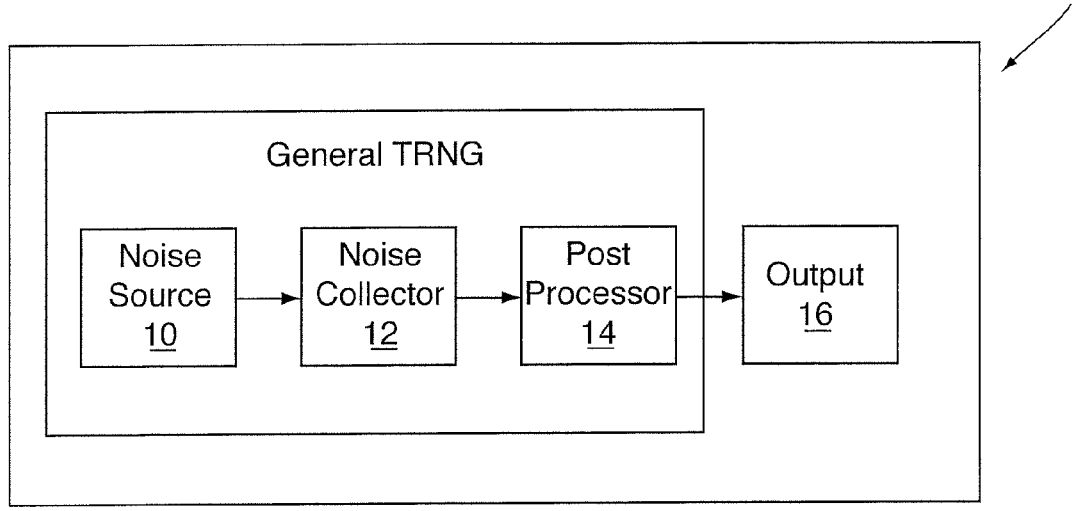
FIG. 1 illustrates schematically the layout of a conventional true random number generator in accordance with the prior art.
Figure 2:
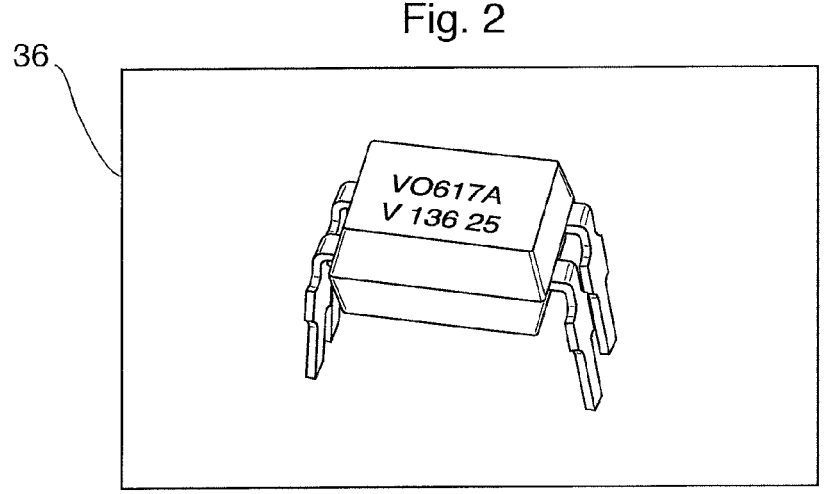
FIG. 2 shows schematically an optoisolator for use in a system for generating random numbers in accordance with a preferred embodiment of the invention.
Figure 3:
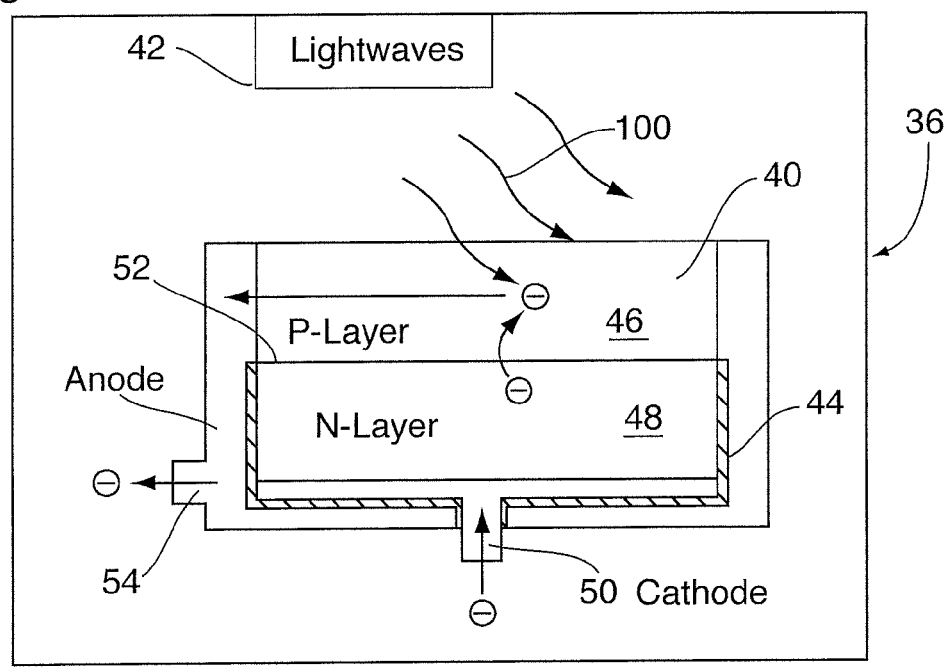
FIG. 3 shows schematically the optoisolator of FIG. 2.

FIGS. 2 and 3 show the optoisolator 36 (also known as an optocoupler, photocoupler, or optical isolators), used in the random number generating system 32. The optoisolator 36 is preferably provided as a solid state semiconductor. As shown in FIG. 3, the optoisolator 36 is formed having a comparatively short optical transmission path 40 a light emitting diode [LED], lamp as an electromagnetic energy source 42 for producing light waves 100, and an electromagnetic energy sensor 44, for converting sensed electromagnetic energy into electrical signals. As shown in FIG. 3, most preferably the sensor 44 is provided in the form of a photodiode which is operable to convert the received light into current. The sensor 44 includes a multi-layer construct of semiconductor materials, and includes a layer of P-type silicon 46 and a bottom layer of N-type silicon 48. Preferably, the optoisolator 36 is further constructed to isolate high voltage and low voltage circuits, to prevent damage to components on the low voltage side, while still providing an electrical signal between the two isolated sides. More preferably, a nonconductive insulator is provided for transmitting the light energy 100, to the sensor 44 or photodetecting component.

As shown schematically in FIG. 3, electrical signals on the input side of the optoisolator 36 is converted to light waves 100 by the electromagnetic energy source 42. The light waves 100 are transmitted across the optical transmission path 22 to be received by the sensor 44. The photons from the light 100 as illustrated in FIG. 3, induce an electrical charge on the base or P-layer 46 of the photodetector sensor 44 via the photoelectric effect.

The light energy 100 striking the sensor 44 thus, induces a charge on the P-layer 46, whereby current starts to move from the cathode 50 (negative electrode) to the N-layer 48, through a barrier 52 or a neutral region between the two layers 46,48 to the P-layer 46 and out the anode 54 (positive electrode). This process continues while photons from the light energy 100 strike the P-layer 46, and ceases when the LED light source 42 is no longer active. As a result, the photodetector sensor 44 is said to be on, while sensing the light energy 100 and current is flowing, and off when there is no flow.

Since the operation of the optoisolator 32 is controlled by light energy 100, the two sides of the optoisolator 36 do not affect each other electrically. Thus, the high voltage circuit used to operate the LED light source 42 remains electrically isolated from the low voltage circuitry of the sensor 44. This advantageously prevents possible problems caused by different voltages, current sneak paths, or ground loops.

It is known that semiconductors, like the optoisolator 36 maybe inherently noisy. As a result of applicant's prototyping, it has been recognized that for noise measurement in an optoisolators in accordance with the preferred embodiment:

1.) The noise of the optoisolator is negligibly influenced by the intensity of LED noise.

2.) The noise of the optoisolator is not influenced by the optical channel.
3.) Noise produced by the optoisolator is primarily caused by the phototransistor embedded in the optoisolator and is of low frequency in nature.
4.) The estimated spectra of the noise inherent in optoisolators have slopes in the range of what is considered to be noise. (i.e. the value of a, the exponent on $1/f^{\alpha}$, is between 0.8 and 1.25).
5) The optoisolator may be provided with a comparatively small overall design, allowing the random number generator 32 to be provided as a compact, or even chip-based design.

It has been recognized that the random number generator 32 may advantageously be provided which is operable to provide a random bit data stream output based on optoisolator produced noise. More particularly, the applicant has appreciated that the noise produced in the operation of the optoisolator 36 and in particular that which originates from thermal noise generated by inherent semiconductor resistance, as well as (collector, emitter, base) phototransistor resistance may advantageously be selected as a variable data source for the generation of true random numbers. In addition, it is further recognized that also intrinsic shot noise and 1/f (or flicker, or pink) noise produced by current flowing through the sensor 44 (or other phototransistor of the optoisolator) may also advantageously be cumulatively digitized as a bit stream data source noise is influenced by the photoelectric effect, where photons stimulate the flow of current through the substrate barrier thereby causing noise in the circuit. In addition, there is also noise associated with photons striking the P-Layer of the phototransistor. Furthermore, the applicant has appreciated that by digitizing the generated noise using the digitizer 40, the generated noise may be converted to a random bit stream for either direct display as output 42 or for further processing in the generation of random numbers.

Figure 5:
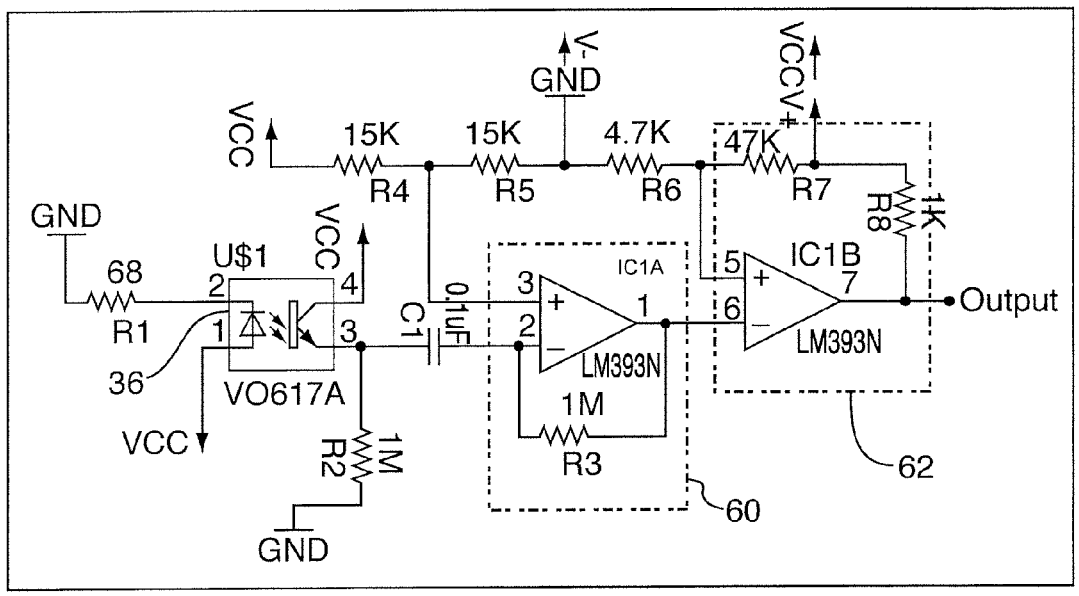
FIG. 5 illustrates a prototype circuit diagram for the amplification and digitization of noise signals provided by the optoisolator of FIG. 3 used in the conversion of background noise to a random bitstream.

FIG. 5 shows schematically a circuit diagram of a prototype of random number generator 32 utilizing a VO617A™ optoisolator 36 as a noise source in accordance with a preferred embodiment. As noted previously, the semi-conductors used in the sensor 44 are selected to exhibit low frequency noise generated by each of such as thermal, flicker, photoelectric, and quantum shot noise. The applicant has recognized that these sources of noise make the optoisolator 36 a good choice for use in the random number generator 32, since photon emission and the photoelectric effect are unpredictable and random events that are resistant to environmental and electromagnetic influence. Also, thermal currents and electron passage through barrier 50 between semiconductors layers 46,48 remain unpredictable due to the thermal agitation of electrons and the non-uniform nature of silicon substrate, respectively.

In operation, the generated noise signal from the optoisolator sensor 44 is fed into the amplifier 38 (FIG. 4) and for example, which may be provided together with the digitizer 40 for dual operation as part of a dual operational (OP-Amp) integrated circuit (IC) shown in FIG. 5. As a first operation the amplifier 38 using amplified circuit 60 amplifies the input noise signal to a usable level, since the level of the inherent noise is typically very low. The second digitizer 40 using the second amplifier circuit 62 discretely digitizes the amplified signal produced in circuit 60 as a digital bit stream for output.

More preferably as will be described, the output is electronically communicated an external or an embedded system or microcontroller 42 operable to interpret the digitized bits as 1's and 0's and provide to determine output.

Reference may be had to FIG. 5 which illustrates a random number generator system 30 in accordance with an alternate embodiment of the invention, and wherein like reference numerals are used to identify like components. In a system 30 of FIG. 6 an optoisolator 36, amplifier 38 and digitizer 40 are provide for the generation and output of a random bit stream based on optoisolator sensor noise in accordance with the previously described embodiment. The system 30 shown in FIG. 6 incorporates as a post processor 66, an Arduino UNO™ Revision 2 microcontroller. As shown schematically in FIG. 6, the post processor 66 is operable to process the random bit stream generated and output by the digitizer 40 for increased randomness.

The prototype Arduino Uno™ microcontroller was selected as the processor 66 based on the ATmega328 microcontroller running at 16 MHz with 32 KB of Flash Memory, 2 KB of SRAM, and 1 KB of EEPROM for user data storage for enhanced random number generation speed. The board operated at 5V DC and provide 14 Digital Input/Output (I/O) pins, as well as 6 analog pins. The Arduino is programmed with a high level language close to the syntax of C. The source code files produced by the Arduino Integrated Developing Environment (IDE) is called a Sketch. The experimental prototype utilized the Arduino IDE version 0022.

The algorithm shown in Table 1, was applied by the processor to the input random bit stream to extract randomness from the digitized random bit stream, and avoid cumbersome complications related to directly sampling the random output bits.

TABLE 1

Pseudo Code for Optoisolator based Random Number Generator-Post processing randomness extraction OptoRNG Randomness Extractor:
-----------------------------
Let interval_time1 be the amount of time between two
    successive rising edges of the bitstream from
    OptoRNG.
Let interval_time2 be the amount of time between the
next two successive rising edges of the
    bitstream from OptoRNG.
    if interval_time1 > interval_time2
        then random_bit = 1;
    else if interval_time1 < interval_time2
        then random_bit = 0;
    end if It is recognized that sampling too fast may give too many bits that are successively the same (i.e. sampling the same bit multiple times). To the contrary, sampling too slow may completely miss the random data.

Sketch code of the extractor algorithm was implemented and applied to the random bitstream using the post processor 66 which sent the processed stream for output via display 68 through a USB port. The communication baud rate for the coded Sketch was 115200 bps. It was found that the speed performance of the prototype random number generator 30 varied between approximately 75 to 110 bits/second. Slower performance is believed to be caused by the fact that the digitized noise has low frequency and the extractor algorithm requires 4 edges per random bit. Another contributing factor is that if the measured interval times between the edges are equal they are discarded.

The inventors have appreciated that simple modifications random number generator 32 may achieve faster speed performance by using a complex post processor. Such modifications may in effect, make the random number generator 32 operate as a hybrid random number generator. In the random number generator system 30, the post processor 66 is used to extract data from the digitized bitstream.

One further possible such modification may be achieved through the use of block ciphers, such as an AES, post processed in processor 66. The advantage or disadvantage (depending on the encryption algorithm) of a system that uses block ciphers as a post processor 66 is that the system strength or weakness comes directly from the cipher. At present, AES is the de facto standard and is considered to be strong, as it produces highly nonlinear output with no correlation to the input and shows no deviation from randomness.

In the preferred embodiment, the random number generator 32 uses the same noise source amplifier 38 and digitizer 40. It is to be appreciated that separate amplifiers and/or digitizers could be provided. The method used to extract the selected random bitstream data is similar to that described with respect to FIG. 4 except instead of directly providing an output, the system 30 uses the generated bitstream to seed three (3) 128-bit values, which are used by the post processor 66, where AES is run in feedback mode.

Figure 6:
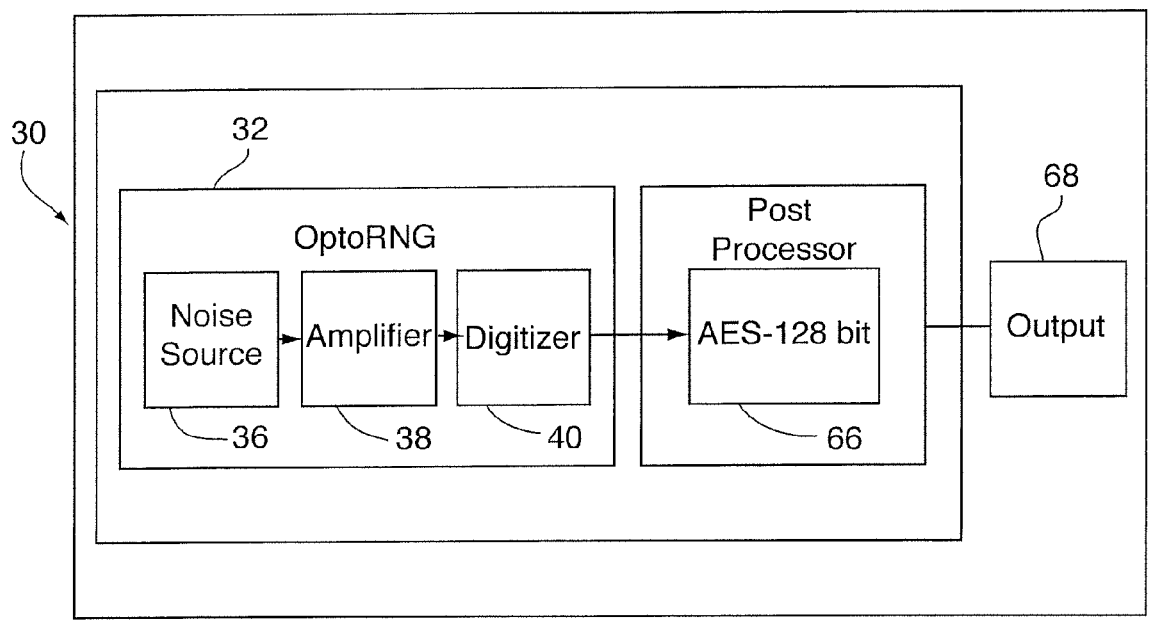
FIG. 6 illustrates schematically an apparatus for generating random numbers using the optoisolator of FIG. 3 in accordance with a second embodiment of the invention.
Figure 7:
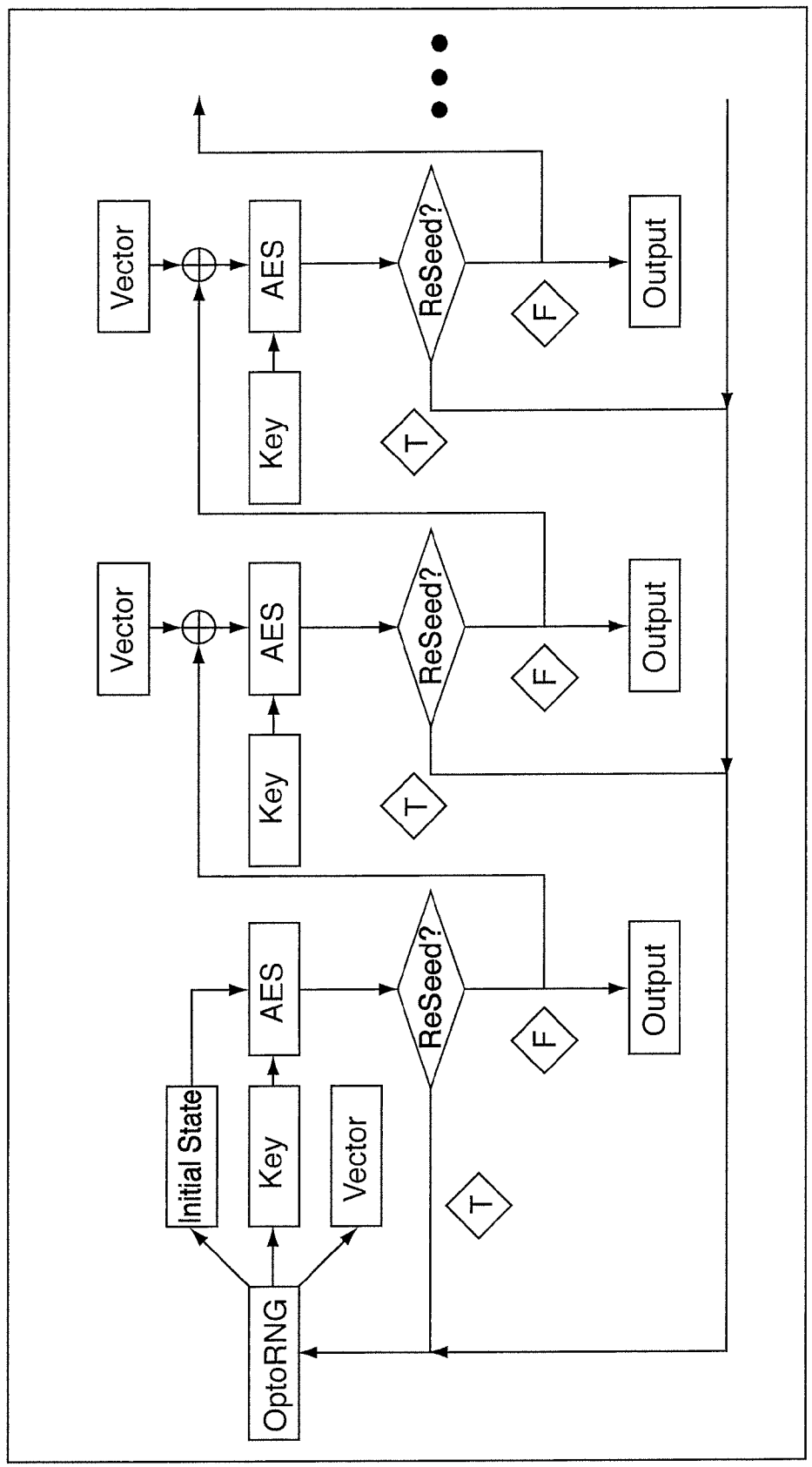
FIG. 7 illustrates a flow chart showing the post processing selection of random number values from generated random bit data.

FIG. 7, shows best a flow chart of the operation of the random number generator 32 of FIG. 6. As shown, the random number generator 32 generates three 128-bit values (Initial State, Key, and Vector). In the first step the Initial State is encrypted by the AES post processor 66 using the Key value. The result is then outputted and fed into the second step, if the Re-Seed condition is false. The Re-Seed condition is defined as a check to see if another three 128-bit values have been generated by the random number generator 32. Since the generation of random bits is comparatively slow, it is expected to have at least one false Re-Seed condition, and thus, at least one output.

As a second step, the output of the previous stage is taken and processed with an additive cipher, such as an XOR cipher with Vector. The result is fed into the AES post processor 66, which produces an output 68 that has been encrypted using the Key. This process is repeated until a Re-seed condition is met, where (Initial State, Key, and Vector) are re-seeded, and the process continues again from the first step.

While the preferred embodiment describes the use of a post processor 66 for random number generation, the invention is not strictly so limited. It is to be appreciated that the system 30 of the present invention could be provided with any suitable microcontroller, embedded system, system on a chip, programmmable gate array, logic device, or other computer used for random number generation.

Similarly, while the preferred embodiment describes the use of quantum shot, thermal, flicker, and photoelectric effect noise in combination as a preferred noise source for amplification and digitization into a random bit stream, it is to be appreciated that the present invention could comprise combinations of only some of such noise sources.

While the detailed description describes the use of LED lamp 42 as a source of electromagnetic radiation, it is to be appreciated that other electromagnetic radiation sources including, without restriction, coherent light sources, UV and IR light sources may also be used, and will now become apparent.

While the detailed description describes and illustrates various preferred embodiments of the invention, the invention is not strictly limited to the constructions which are so disclosed. Modifications and variations will now occur to a person skilled in the art. For a definition of the invention, reference may be had to the appended claims.

We claim:

1. An apparatus for generating random numbers comprising,
    an optoisolator including,
        a light source operable to output electromagnetic energy,
        a sensor for sensing electromagnetic energy output by the light source, an optical transmission path for propagating the output electromagnetic energy generated by the light source to the sensor, the sensor being electrically isolated from the light source and operable to convert said sensed electromagnetic energy to electric signals, and wherein
        the sensing of said electromagnetic energy by said sensor produces electronic noise signals selected from at least one of the group consisting of flicker, thermal noise, quantum shot noise and photoelectric noise,
    a digital converter for digitally converting the produced noise signals into a bitstream, and
    a processor electronically communicating with the digital converter, the processor having programme instructions operable to process input bits from the bitstream and generate output bits based thereon a representative of a random number.

2. The apparatus as claimed in claim 1, wherein the sensor is selected from the group consisting of a phototransducer and photodiode.

3. The apparatus as claimed in claim 2, wherein the light source comprises a light emitting diode (LED).

4. The apparatus as claimed in claim 3, wherein the optical transmission path is provided as a non-conductive insulator.

5. The apparatus as claimed in claim 1, further including an amplified electronically communicating with the sensor and digital converter, the amplifier being operable to amplify the noise signals.

6. The apparatus as claimed in claim 1, wherein the noise signals include in combination each of said thermal noise, quantum shot noise, flicker noise and photoelectric noise, the apparatus further comprising an amplifier for amplifying the produced noise signals.

7. The apparatus as claimed in claim 1, wherein the digital converter comprises a digitizer selected to discretely digitize the produced noise signals.

8. The apparatus as claimed in claim 1, wherein the optical transmission path comprises a solid state semiconductor.

9. The apparatus as claimed in claim 1, wherein the light source is a coherent light source, and the output electromagnetic energy comprises a coherent light beam.

10. The apparatus as claimed in claim 1, wherein the programme instructions comprise instructions for processing the bitstream using a Von Neumann corrector algorithm.

11. The apparatus as claimed in claimed 1, wherein the optical transmission path comprises a solid state transmission path which is provided as a non-conductive insulator.

12. A random number generation apparatus comprising:
    an optoisolator including,
        an electromagnetic energy source operable to output electromagnetic energy,
        a sensor for sensing output electromagnetic energy, and
        an optical transmission path optically coupling said electromagnetic energy source and said sensor, the sensor comprising at least one of a phototransducer and a photodiode which on receiving at least part of the output electromagnetic energy is operable to produce electric noise signals from each of the group consisting of thermal noise, flicker noise, quantum shot noise and photoelectric noise, a digitizer for receiving and digitally converting said noise signals into a bitstream, and a processor electronically communicating with the digitized for receiving said bitstream, the processor including program instructions for processing pairs of bits from the bitstream using a Von Neumann correction, and for generating output bits in the event of a transition in the input bitstream.

13. The apparatus as claimed in claim 12, wherein the bitstream is a random bitstream.

14. The apparatus as claimed in claim 12, wherein the optic transmission path comprises a solid state semiconductor, said semiconductor substantially electrically isolating said electromagnetic energy source from said sensor.

15. The apparatus as claimed in claim 12, wherein the sensor comprises said phototransducer for sensing the part of the output energy.

16. The apparatus as claimed in claim 12, further comprising an amplifier electrically communicating with said sensor and being operable to amplify the produced noise signals.

17. The apparatus as claimed in claim 12, wherein the electromagnetic energy source comprises a light emitting diode.

18. A random number generation apparatus comprising:
an optic coupler comprising a light source operable to output electromagnetic energy, a light sensor and an optical transmission path for propagating the output electromagnetic energy to the light sensor for sensing, the light sensor being operable to convert sensed electromagnetic energy to electric signals, and wherein the propagation of said output electromagnetic energy along said optical transmission path and/or the sensing of electromagnetic energy by the light sensor produces noise signals selected from two or more of the group consisting of thermal noise, quantum shot noise, flicker and photoelectric noise, an amplifier for receiving and amplifying said noise signals, a digitizer for receiving and digitally converting said amplified noise signals into a bitstream, and a processor electronically communicating with said digitizer and having stored thereon program instructions for processing input bits from the bitstream, and generated an output variable bit rate based thereon representative of a random number.

19. The apparatus as claimed in claim 18, wherein said bitstream comprises a random bitstream, and said program instructions are operable to process said input bits and output said variable bit rate using a Von Neumann corrector algorithm.

20. The apparatus as claimed in claimed 19, wherein the optical transmission path comprises a solid state transmission path which is provided as a non-conductive insulator.

* * * * *